United States Patent
Morkoski et al.

[15] 3,698,486
[45] Oct. 17, 1972

[54] STEERING COMPENSATOR TO ALTERNATELY OFFSET THE TAIL WHEEL ON SEMI-MOUNTED TWO-WAY PLOWS

[72] Inventors: James Morkoski, Memphis; Louis B. Garriott, Jr., Knoxville, both of Tenn.

[73] Assignee: International Harvester Company, Chicago, Ill.

[22] Filed: Jan. 10, 1972

[21] Appl. No.: 216,405

Related U.S. Application Data

[63] Continuation-in-part of Ser. No. 45,457, June 11, 1970, abandoned.

[52] U.S. Cl. ................................. 172/212, 172/291
[51] Int. Cl. ......... A01b 3/42, A01b 3/46, A01b 5/14
[58] Field of Search ....... 172/204, 209, 211, 212, 291

[56] References Cited

UNITED STATES PATENTS

| | | | |
|---|---|---|---|
| 2,202,348 | 5/1940 | Leach | 172/212 |
| 2,561,032 | 7/1951 | Onfrey | 172/212 |
| 3,186,496 | 6/1965 | Cox et al. | 172/211 |
| 3,507,334 | 4/1970 | Watts | 172/212 |
| 3,598,185 | 8/1971 | Richey | 172/212 |

*Primary Examiner*—Robert E. Pulfrey
*Assistant Examiner*—C. W. Hanor
*Attorney*—Floyd B. Harman

[57] ABSTRACT

A semi-mounted two-way plow has a supporting frame which in its alternate operating positions is arranged diagonally and has a combination transport and gauge wheel at its rear end which follows a path laterally offset from the center line of the tractor in each of its operating positions, the wheel being steered by means compensating for the offset position of the wheel to constrain the wheel to follow the tractor when turning and to retain its parallel relation to the path of travel in both operating positions.

8 Claims, 8 Drawing Figures

PATENTED OCT 17 1972
3,698,486
SHEET 1 OF 4
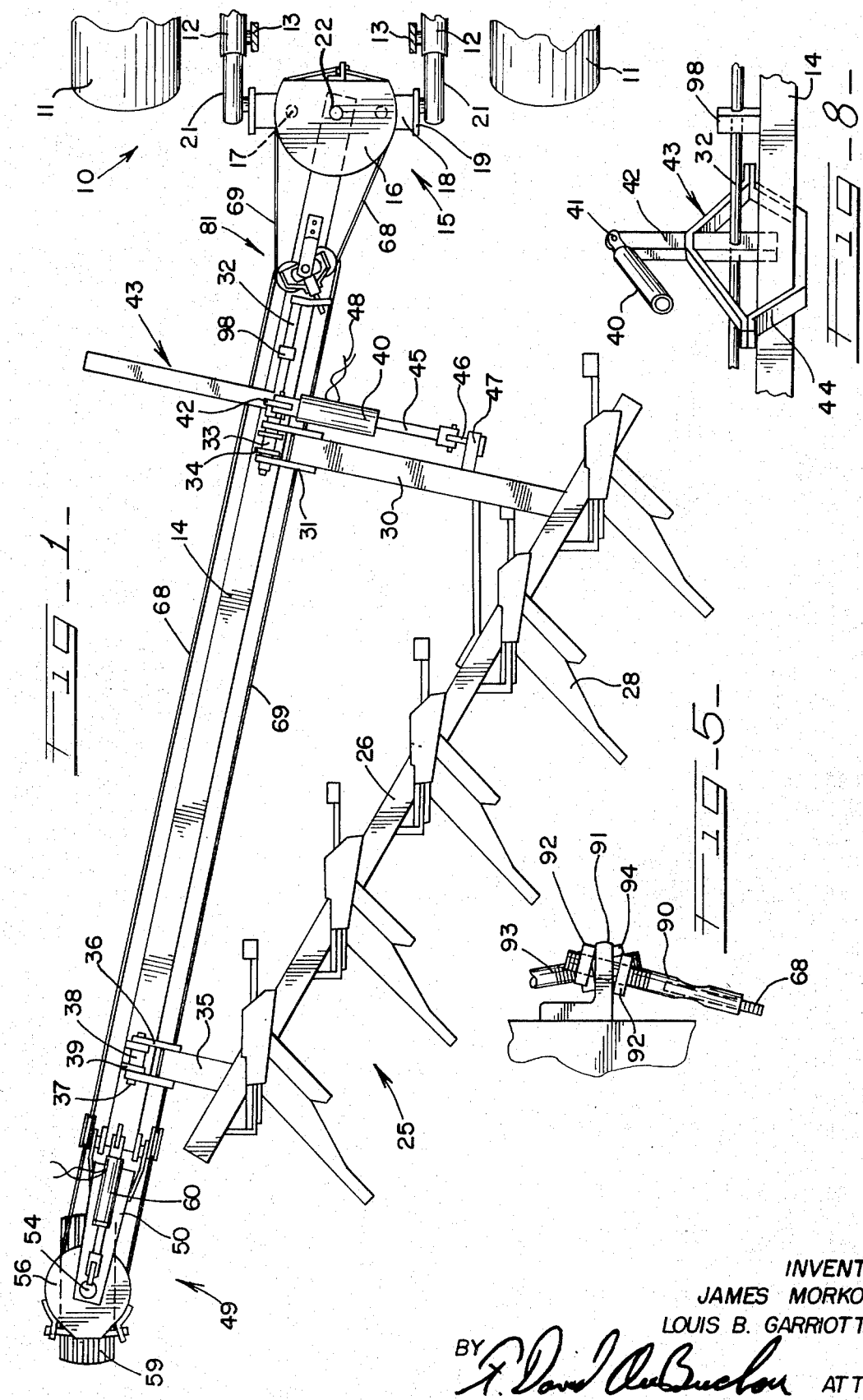
INVENTORS
JAMES MORKOSKI
LOUIS B. GARRIOTT, JR.
BY F. David AuBuchon ATT'Y.

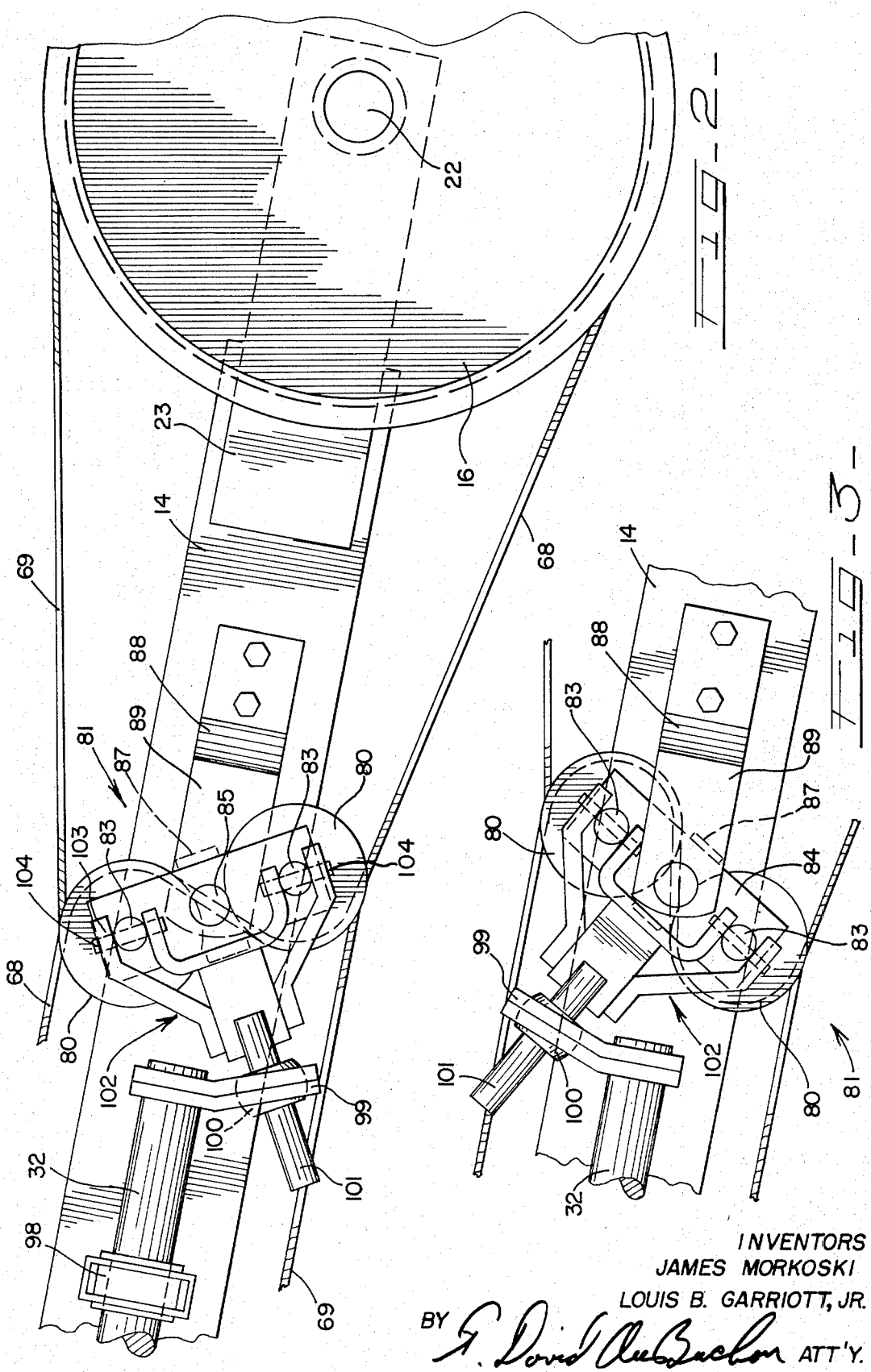

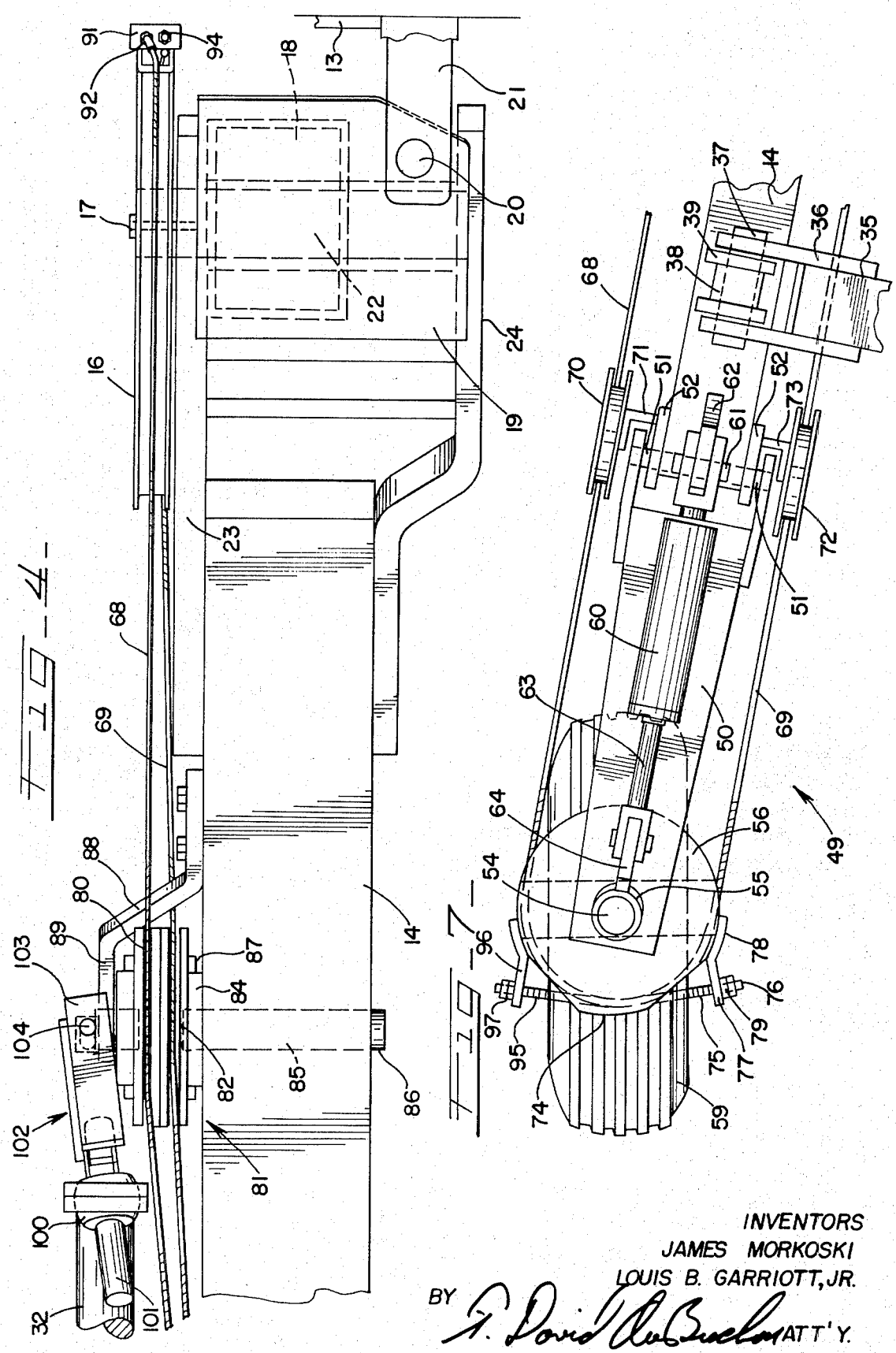

STEERING COMPENSATOR TO ALTERNATELY OFFSET THE TAIL WHEEL ON SEMI-MOUNTED TWO-WAY PLOWS

CROSS-REFERENCE TO RELATED APPLICATIONS

This application is a continuation-in-part of our earlier filed application Ser. No. 45,457 filed June 11, 1970, now abandoned.

BACKGROUND OF THE INVENTION

This invention relates to tractor propelled two-way plows and particularly to semi-mounted plows of the roll over type wherein the tool carrier is mounted on a supporting frame for swinging about a longitudinal axis to alternately dispose the plow bottoms in position for right and left hand plowing.

Conventional semi-mounted two-way plows usually comprise a frame having a coaxial plow carrier mounted thereon for rotation between alternate operating positions with the rear end of the plow supported by furrow and land wheels, the furrow wheel engaging the furrow bottom and the land wheel riding on unplowed ground and gauging the operating depth of the plow bottoms, the gauge wheel usually being mounted on the tool carrier to revolve with it and to function in both operating positions of the plow. The construction of such two-way plows has been complicated and expensive and their performance has been inadequate to meet the needs of the trend toward larger multi-bottom plows for use with increasingly powerful modern tractors. Therefore, an object of the present invention is the provision of an improved multi-bottom plow of simple and economical construction wherein the rear of the plow is supported by a single wheel assembly adapted to perform the function of a transport and land wheel.

Another object of the invention is the provision of a tractor propelled two-way plow of the semi-mounted type wherein the supporting frame assumes a diagonal position behind the tractor with a steerable supporting wheel laterally offset from the tractor center line arranged to follow a path parallel to the tractor center line and the direction of travel and wherein the supporting frame and wheel are allowed to swing laterally to the opposite diagonal between the right and left hand operating positions of the plow.

Another object of the invention is the provision, in a two-way plow wherein the rear end of the plow is laterally swingable to opposite sides of the tractor center line and is supported by a single steerable wheel, of means for steering the wheel by the turning motion of the tractor while compensating for the laterally offset position of the wheel to constrain the wheel to follow a path parallel to the tractor center line in both operating positions of the plow, and upon turning the tractor in one direction, to steer the wheel in the opposite direction to cause it to follow a path concentric with the turning axis of the tractor.

DESCRIPTION OF THE DRAWINGS

FIG. 1 is a plan view, with parts removed, of the rear end of a tractor having connected thereto a two-way plow incorporating the features of this invention;

FIG. 2 is an enlarged detail of a portion of the structure of FIG. 1 showing one position of the compensating mechanism with the plow in the right hand plowing position;

FIG. 3 is a detail similar to FIG. 2 showing the compensating mechanism reversed for the left hand operating position of the plow;

FIG. 4 is an enlarged view in side elevation of the structure shown in FIG. 2;

FIG. 5 is a detail of a portion of the structure shown in FIGS. 1 and 4;

FIG. 7 is a plan view of the rear end of the plow shown in FIG. 1; and

FIG. 8 is a detail in perspective of a portion of the structure shown in FIG. 1.

DESCRIPTION OF THE PREFERRED EMBODIMENT

Figure 6:
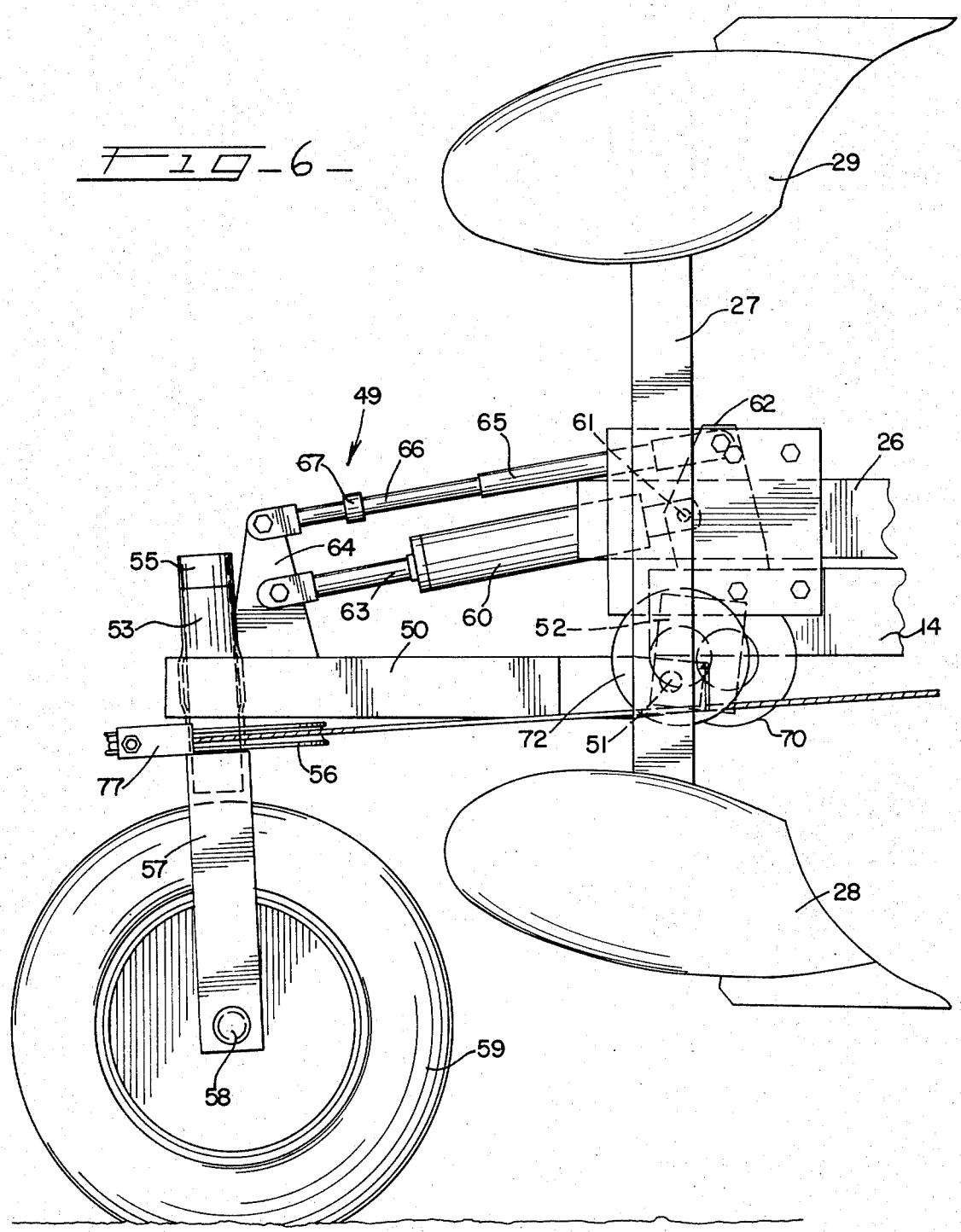
FIG. 6 is a side elevation of the rear end of the plow showing the mounting of the combination transport and gauge wheel with the plow bottoms in an elevated position.

The numeral 10 designates a tractor having drive wheels 11 and the relatively stationary spaced socket hitch members 12 of a tractor hitch. It may be understood that the tractor is provided with the usual power plant and steering mechanism as well as a source of fluid under pressure under the control of the tractor operator and providing power to operate the plow and to raise and lower the hitch members through the intermediary of lift links indicated at 13 and to hold the hitch in a selected vertical position.

The two-way plow of this invention comprises an elongated main frame member in the form of a beam 14 having relatively stationary hitch structure 15 at its forward end comprising a steering pulley segment 16 secured by screws 17 to a transverse drawbar 18, having at its ends depending plates 19 carrying hitch pins 20 upon which are mounted the rear ends of shaft members 21 which are receivable and lockable in socket members 12 of the tractor hitch in a manner well known in the art.

Steering pulley 16 is mounted on the upper end of a vertical pivot pin 22 mounted in a central opening provided in drawbar 18 and supported between a pair of forwardly projecting plates 23 and 24 affixed to beam 14, to accommodate lateral swinging of the main frame relative to the tractor and the steering pulley 16, from the diagonal position shown in FIG. 1 with the rear end of the main supporting frame offset laterally to the left of a center line through the tractor and pivot pin 22, to a position on the opposite diagonal with the rear end of the main frame laterally offset to the right of said center line.

A tool carrier 25 is mounted on the main frame and comprises a diagonal frame member 26 to which is secured a plurality of standards 27 on opposite ends of which are mounted right and left hand plow bottoms 28 and 29, respectively, as clearly shown in FIG. 6. In FIG. 1 the plow carrier is shown on the right hand side of the main frame member 14 and in position for right hand plowing.

A frame bar 30 is affixed at its outer end to the forward portion of member 26 and extends inwardly therefrom, as shown in FIG. 1. The inner end of bar 30 has affixed thereto a pair of projecting ears 31 apertured to receive the rear end of a rockable shaft 32 rotatable in a bearing 33 mounted between a pair of lugs 34 affixed to and projecting upwardly from beam 14. Another frame bar 35 is affixed at one end to the rear portion of frame member 26 and to its inner end are secured spaced plates 36 mounted on the ends of a stub shaft 37 rotatable in a bearing 38 mounted between a pair of lugs 39 affixed to beam 14, and in axial alignment with shaft 32. Carrier 25 is thus rotatable about an axis parallel to the main frame 14 and is swingable from the right hand plowing position of FIG. 1 to the alternate or left hand plowing position with the left hand plow bottoms 29 disposed in plowing position on the opposite or left hand side of the main frame, the latter then swinging laterally to the opposite diagonal on the right hand side of the tractor center line.

Rotation of the carrier 25 about the axis of aligned shafts 32 and 37 between alternate operating positions of the plow is accomplished by the provision of a hydraulic cylinder 40 pivotally anchored to a pin 41 carried at the upper end of a mast 42 affixed to and projecting upwardly from a transverse stop bar structure 43 affixed to beam 14 and extending laterally from opposite sides thereof and including a brace 44 extending under the beam. The lower end of mast 42 is secured to the beam and has a bearing opening therein to receive shaft 32. A piston rod 45 slidable in cylinder 40 is pivotally connected to an ear 46 secured to a lug 47 affixed to and projecting forwardly from bar 30 of the tool carrier.

In the position of the parts in FIG. 1, the piston rod is fully extended in the right hand operating position of the plow and lug 47 is engageable with stop bar 43 to limit downward movement of the tool carrier relative to the main frame. Fluid under pressure is supplied to cylinder 40 through hose lines 48 under the control of the tractor operator in well known manner by the operation of suitable valve control means provided to extend and retract rod 45 in the cylinder, and since the cylinder is anchored to mast 42 at a location vertically spaced above the main frame a lever arm is provided by the downward and outward inclination of the cylinder and piston rod to rotate the shaft 32 upon retraction of the rod in the cylinder, and swing the tool carrier upwardly until it passes a center position, whereupon the operator again extends the piston rod to move the carrier to the left hand plowing position, in a manner well known in the art, with log 47 engageable with the other end of bar 43.

The rear end of the plow is supported in operating and transport positions by a combination transport and gauge wheel assembly 49, shown in FIG. 6 with the operating right hand plow bottoms 28 elevated above the ground. In this position it may be understood that the front end of the plow has also been raised by operating the hydraulic power lifting mechanism of the tractor through lift links 13 to raise the hitch members 12 and drawbar 18.

A wheel supporting arm 50 is bifurcated at its forward end for pivotal mounting on a pin 51 carried by plates 52 affixed to and depending from beam 14, and an opening in the rear end of arm 50 seats a bearing 53 to rotatably receive a vertical spindle 54 to the upper end of which is secured a retaining collar 55. A rotatable member in the form of a pulley 56 is mounted on the spindle below arm 50 and a yoke 57 secured to the lower end of the spindle carries at its lower end an axis 58 upon which is mounted a ground engaging combination transport and gauge wheel 59. Steering motion is transmitted to pulley 56 to steer wheel 59 from steering pulley 16 by means hereinafter to be described.

Vertical movement of wheel arm 50 relative to the main frame to raise and lower the rear end of the plow is achieved by the provision of a conventional double acting hydraulic cylinder 60 pivotally anchored at 61 to a bracket 62 affixed to beam 14 and having a piston rod 63 slideable therein pivotally connected to a standard 64 mounted on the rear of arm 50. Hydraulic fluid under pressure is delivered to cylinder 60 from the tractor source to extend and retract rod 63 and swing arm 50 about its pivotal connection at 51 to the beam 14. Means are provided and shown in FIG. 6 for limiting the downward movement of the operating plow bottoms relative to the wheel, comprising a sleeve member 65 pivotally connected to the upper end of bracket 62 and generally parallel to cylinder 60, and a rod 66 slidable in the sleeve is pivotally connected to the upper end of standard 64. An adjustable collar 67 is engageable with the end of the sleeve.

In the right hand plowing position of FIG. 1, wheel 59 is shown following a path parallel to the direction of travel and laterally offset from the tractor center line to engage unplowed ground. Upon turning the tractor, for example, to the right or clockwise, the rear wheel must be rotated about the axis of spindle 54 in the opposite or counterclockwise direction so that the wheel will lead outwardly to the left and follow a path concentric with the turning axis of the tractor. Furthermore, this must be accomplished in the alternate operating position of the plow and the wheel maintained in a path parallel to the direction of travel when the left hand plow bottoms are in operation and the main frame member 14 has swung laterally about the axis of pin 22 to the opposite diagonal. Thus, in the alternate or left hand plowing position of the plow, should the tractor be turned to the left or counterclockwise, for example, spindle 54 must be rotated in the opposite or clockwise direction to properly follow the tractor.

A first and second cable 68 and 69 respectively extend between pulleys 16 and 56, cable 68 being guided by an idler 70 mounted on bracket 71 secured to plate 52 on one side of beam 14, a similar idler 72 being mounted on a bracket 73 secured to the other plate 52. From idler 70 cable 68 is trained around the left hand peripheral portion of wheel pulley 56 between protective lips 74 formed on the pulley and a threaded bolt 75 having a head 76 is secured to the end of the cable and is receivable in an opening provided in the outwardly angled ear 77 of a bracket 78 affixed to the pulley. Nuts 79 are mounted on the bolt for adjusting the tension on the cable. As can be best seen in FIG. 7 the securement of cable 68 to wheel pulley 56 is the structural equivalent of connecting cable 68 to a left hand lever that extends from the center of wheel pulley 56.

The forward end of cable 68 is trained, in the manner indicated in FIGS. 2 and 3 around a pair of laterally spaced idler pulleys 80 forming part of a compensator assembly designated at 81 and including another pair of idlers 82 rotatably mounted below and coaxially with idlers 80 on spindles 83 between plates 84, plates 84 being connected by vertical bars 87. Plates 84 are pivotally mounted on beam 14 by a two-piece pin 85. The lower portion of pin 85 is secured to beam 14, for example by welding, and is received in an aperture formed in lower plate 84. The upper portion of pin 85 is secured to the upper horizontal portion 89 of a bracket 88, for example by welding, and is pivotally received in an aperture formed in upper plate 84. Bracket 88 is secured to beam 14 by bolts such that the upper and lower portions of pin 85 are axially aligned to thus pivotally mount the pulley assembly about the axis of pin 85 for lateral swinging between the positions shown in FIGS. 2 and 3.

From pulleys 80 the forward end of cable 68 is trained around the right hand side of relatively stationary steering pulley 16 and has secured to its end threaded bolt means 90 shown in FIG. 5 slidably receivable in an opening provided in a log 91, and tension on the cable may be adjusted by nuts 92 on opposite sides of the lug. As can be best seen in FIG. 1 the securement of cable 68 to stationary steering pulley 16 is the structural equivalent of connecting cable 68 to a right hand lever that extends from the center of stationary steering pulley 16.

Cable 69 is trained about the left side of pulley 16 and its forward end is anchored in the same manner as cable 68 by providing bolt means 93 similarly receivable in an opening in lug 91 and secured by nuts 94. As can be best seen in FIG. 1 the securement of cable 69 to stationary wheel pulley 16 is the structural equivalent of cable 69 to a left hand lever that extends from the center of stationary wheel pulley 16. Cable 69 is trained through the lower pulleys 82 of the compensator 81 and is directed rearwardly along the right hand side of beam 14, engaging idler 72 and the right hand side of wheel pulley 56. Cable 69 terminates in a bolt 95 receivable in an opening in a bracket 96 secured to the pulley and is provided with adjusting nuts 97. As can be best seen in FIG. 7 the securement of cable 69 to the wheel pulley 56 is the structural equivalent of connecting cable 69 to a right hand lever that extends from the center of wheel pulley 56.

In the right hand operating position of the plow the compensator 81 is angled about its pivot axis in the manner shown in FIG. 1. In this position the effective length of cable 69 between the left side of pulley 16 and the right side of pulley 56 has been shortened relative to cable 68 and wheel 59 is constrained to follow a path parallel to the center line of the tractor, and a right turn of the tractor, for example, is transmitted to wheel 59 to turn it to the left.

When reversing cylinder 40 is retracted to raise the tool carrier and then extended to swing the tool carrier to its alternate operating position with left hand plow bottoms 29 in operation and with lug 47 engaging the left hand end of the bar structure 43, the plow swings to the opposite diagonal with wheel 59 offset to the right hand side of the tractor center line.

Shaft 32 extends forwardly and is supported in a bearing 98, and an actuating arm 99 affixed to the end of the shaft has a swivel 100 mounted therein connected to the stem 101 of a fork 102 having fingers 103 pivotally connected to pins 104 seated in openings provided in the upper ends of spindles 83. Thus, rotation of shaft 32 and plow carrier 25 causes arm 99 to swing the compensator assembly 81 laterally from the position of FIG. 2 to that of FIG. 3. In this position slack is introduced into cable 69 and taken up by the relative shortening of cable 68, so that in the left hand operating position of the plow wheel 59 again follows a path parallel to the tractor center line, and turning motion of the tractor turns wheel 59 in the opposite direction.

From the foregoing description it should be understood that opposite sides of pulleys 16 and 56 function as lever arms in transmitting steering motion to the rear wheel, and that operation of the pulley assembly 81 compensates for the laterally offset position of the rear wheel in both operating positions of the plow. Further, the compensator is automatically reversed by the roll over mechanism when cylinder 40 is actuated to swing the plow carrier between its right and left hand operating positions.

What is claimed is:

1. In a two-way plow, hitch means for connecting the plow to a tractor including a relatively stationary steering member and a vertical pivot member, a main frame extending diagonally of the direction of travel having a ground engaging wheel assembly mounted about a vertical axis on its rear end, a plow carrier mounted on the main frame for rotation relative thereto between alternate operating positions for right and left hand plowing, the forward end of said main frame being pivotally connected to said pivot member for lateral swinging between opposite diagonals in response to rotation of the plow carrier between said alternate positions with said wheel assembly laterally offset from the center line of the tractor in each of said operating positions, a rotatable steering member mounted on said wheel assembly for turning the wheel assembly about said vertical axis, and steering transmission means connected at laterally spaced locations to said relatively stationary member and said rotatable steering member for turning said wheel assembly in response to turning the tractor including compensating means effective in either of said alternate operating positions of the plow to compensate for the laterally offset position of said wheel and to turn the wheel assembly in a direction opposite to the direction the tractor is turned, said relatively stationary steering member and said rotatable steering member including means serving as right and left hand lever arms extending laterally from opposite sides of the center of said steering members, said steering transmission means including connecting means which include first and second flexible cables, said connecting means connecting the right and left hand lever arms of said relatively stationary steering member to the left and right hand lever arms, respectively, of said rotatable steering member, whereby turning of the tractor and the relatively stationary member in one direction is transmitted to the rotatable steering member through said compensating means to turn it in the other direction, said compensating means including means carried by said main frame and operably connected to said plow carrier and operably engageable with said first and second cables to shorten the effective length of said first cable with respect to said second cable in one of said operating positions of the plow and to shorten the effective length of said second cable with respect to said first cable in the other operating position of the plow to effect said lateral offset position of said wheel assembly when said plow carrier is rotated between right and left hand positions.

2. The invention set forth in claim 1, wherein shaft means is mounted on the main frame and secured to said plow carrier and power operated means is mounted on the main frame and operatively connected to the plow carrier for revolving the latter about the axis of the shaft means between positions for right and left hand plowing.

3. The invention set forth in claim 2, wherein said wheel in its laterally offset position in one of the operating positions of the plow follows a path parallel to the center line of the tractor and said compensating means is effective upon lateral swinging of the main frame to the opposite diagonal and rotation of the plow carrier to its other or opposite hand plowing position to turn the wheel relative to the main frame and maintain said wheel in a path parallel to the center line of the tractor.

4. The invention set forth in claim 3, wherein said compensating means is an idler assembly pivotally mounted about a vertical axis on the main frame, said idler assembly including a pair of idler pulleys pivotally supported by said assembly about vertical axes offset from the vertical axis of said assembly and around which said cables are trained, said idler assembly being operatively connected to said plow carrier to pivot about its vertical axis upon rotation of said plow carrier and being disposed, in one of the alternate operating positions of the plow, in a position to effectively shorten one of said cables relative to the other and being pivoted in a reverse direction about its pivot axis, upon movement of the plow to its other operating position, to shorten the effective length of the other of said cables relative to said one of said cables.

5. The invention set forth in claim 4, wherein an actuating arm is mounted on said shaft and is operatively connected to said idler assembly for shifting the latter about its pivot axis in response to rotation of said plow carrier about the axis of said shaft between the alternate operating positions of the plow carrier.

6. The invention set forth in claim 5, wherein said wheel is carried by a vertical spindle rotatably mounted on the frame and said rotatable steering member and said relatively stationary steering member are pulleys secured respectively to said spindle and said vertical pivot member, the ends of said cables being partly trained around and secured to the respective of said pulleys.

7. The invention set forth in claim 6, wherein the connections of said cables to at least one of said pulleys are adjustable to vary the tension on the cables.

8. In a two-way plow having a main frame member extending diagonally of the direction of travel with its rear end laterally offset from the center line of the tractor in one of the operating positions of the plow, rotatable shaft means mounted on the main frame, a plow carrier having right and left hand plow bottoms thereon secured to said shaft means for rotation therewith to opposite sides of the axis of said shaft means between alternate operating positions for right and left hand plowing, a ground engaging wheel assembly including a vertical spindle mounted on the rear of the main frame to follow a path laterally offset from and parallel to the center line of the tractor in one of the alternate operating positions of the plow, a rotatable pulley secured to said spindle and rotatable to steer said wheel, hitch means relatively stationary with respect to the tractor at the forward end of the main frame for connection of the plow to the tractor including a steering pulley secured to the hitch means, means pivotally connecting the forward end of the main frame to said steering pulley at the center thereof for lateral swinging of the main frame relative thereto to the opposite diagonal with said wheel offset to the other side of said center line upon rotation of the plow carrier to its alternate operating position, a pair of cables connecting and transmitting steering motion of the tractor from said steering pulley to said rotatable pulley, and compensating means operatively connected to said cables to shorten the effective length of one of said cables relative to the other to maintain the parallel relation of said wheel to said center line in one of said operating positions of the plow, said compensating means being shiftable to shorten the effective length of the other of said cables relative to said one of said cables in response to the rotation of said plow carrier to its alternate operating position to constrain said wheel to follow a path parallel to said center line upon lateral swinging of the main frame to the opposite diagonal, said compensating means is operatively connected to said plow carrier to shift said compensating means in response to rotation of the plow carrier from said one of said alternate operating positions to the other, and wherein said compensating means comprises vertically spaced pairs of idler pulleys pivotally mounted on the main frame for angular shifting between positions for alternately shortening said cables and a lever mounted on said shaft means is operatively connected to said idler pulley to shift the latter in response to the rotation of said shaft.

* * * * *